United States Patent
Price

[15] 3,676,982
[45] July 18, 1972

[54] METHOD AND APPARATUS FOR SCRUBBING GASES

[72] Inventor: Franklin Carr Price, 33 W. 16th St., Chicago Heights, Ill. 60411

[22] Filed: Aug. 14, 1970

[21] Appl. No.: 63,681

[52] U.S. Cl..................................55/95, 55/227, 55/250, 55/255, 55/256
[51] Int. Cl...................................................B01d 47/02
[58] Field of Search....................55/95, 227, 244, 250, 256, 55/255

[56] References Cited

UNITED STATES PATENTS

| 3,524,631 | 8/1970 | Mare | 55/255 X |
| 1,223,684 | 4/1917 | Fleming | 55/256 |
| 1,175,366 | 3/1916 | Lucas | 55/256 X |

Primary Examiner—Howard R. Caine
Attorney—Wolfe, Hubbard, Leydig, Voit & Osann, Ltd.

[57] ABSTRACT

A method and apparatus for efficiently scrubbing gases in which gas is discharged into a body of liquid and forced beneath a flat distributor plate disposed well within the liquid. The gas volumetric radial flow rate and liquid head causes a thin, high velocity gas stream to be developed giving a high scrubbing and reaction efficiency.

8 Claims, 3 Drawing Figures

INVENTOR.
FRANKLIN CARR PRICE,
BY
Wolfe, Hubbard, Leydig, Voit & Osann
ATTORNEYS.

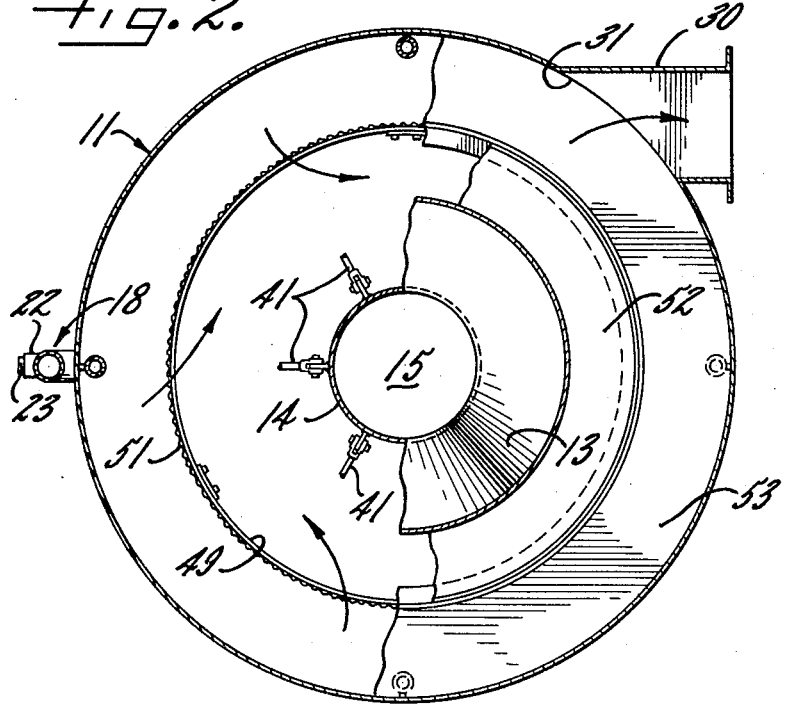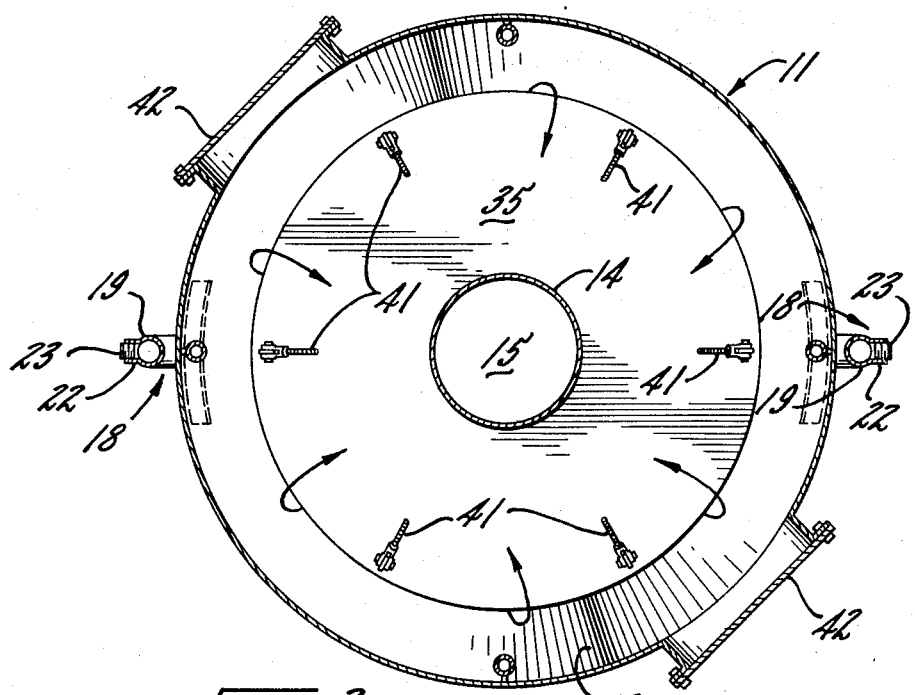

METHOD AND APPARATUS FOR SCRUBBING GASES

DESCRIPTION OF THE INVENTION

This invention relates generally to collector apparatus and more particularly to those devices known as gas scrubbers.

The handling of gases generated from cupolas, with their substantial amounts of entrained particular matter, presents a serious problem for the metallurgical industry. This is particularly true because many installations are relatively small in size and the effective collection of the particulate matter imposes a potentially large capital investment and high operating costs. Consequently, many present installations are inadequately equipped, and this of course results in the emission of offensive pollutants into the atmosphere.

Gas scrubbers also present substantial maintenance problems because of the nature of the particulate matter present in the gases being cleaned. Basically, these problems fall within two categories when the scrubber is used in connection, for example, with a cupola: first, erosion arising from the abrasive action of the high velocity movement of coke, metallic dusts and metallic oxides in the collecting apparatus; and, second, corrosion arising from the acidic solutions formed by the hydrolysis of $SO_2$ and $CO$ which exist due to the use of a reducing atmosphere within the melting zone of the cupola.

Accordingly, it is the primary aim of the invention to provide an improved scrubber for effectively reducing air pollution by being suitable for a wide variety of applications including the removal of particulate matter, harmful gases and obnoxious odors at high efficiency from large volumes of gas.

An object of the invention is to provide a method and apparatus of the above kind utilizing natural laws of gas flow to promote the highly efficient collection of entrained particulate matter from the gas while at the same time reducing the attendant maintenance problems normally associated with such scrubber devices.

Another object is to provide a scrubber of the above character which is relatively inexpensive to manufacture, set up and maintain, and which is readily adaptable for use in connection with existing facilities.

Other objects and advantages of the invention will become apparent upon reading the following detailed description and upon reference to the drawings, in which:

FIG. 2 is a section taken approximately along the line 2—2 in FIG. 1; and

FIG. 3 is a section taken approximately along the line 3—3 in FIG. 1.

Figure 1:
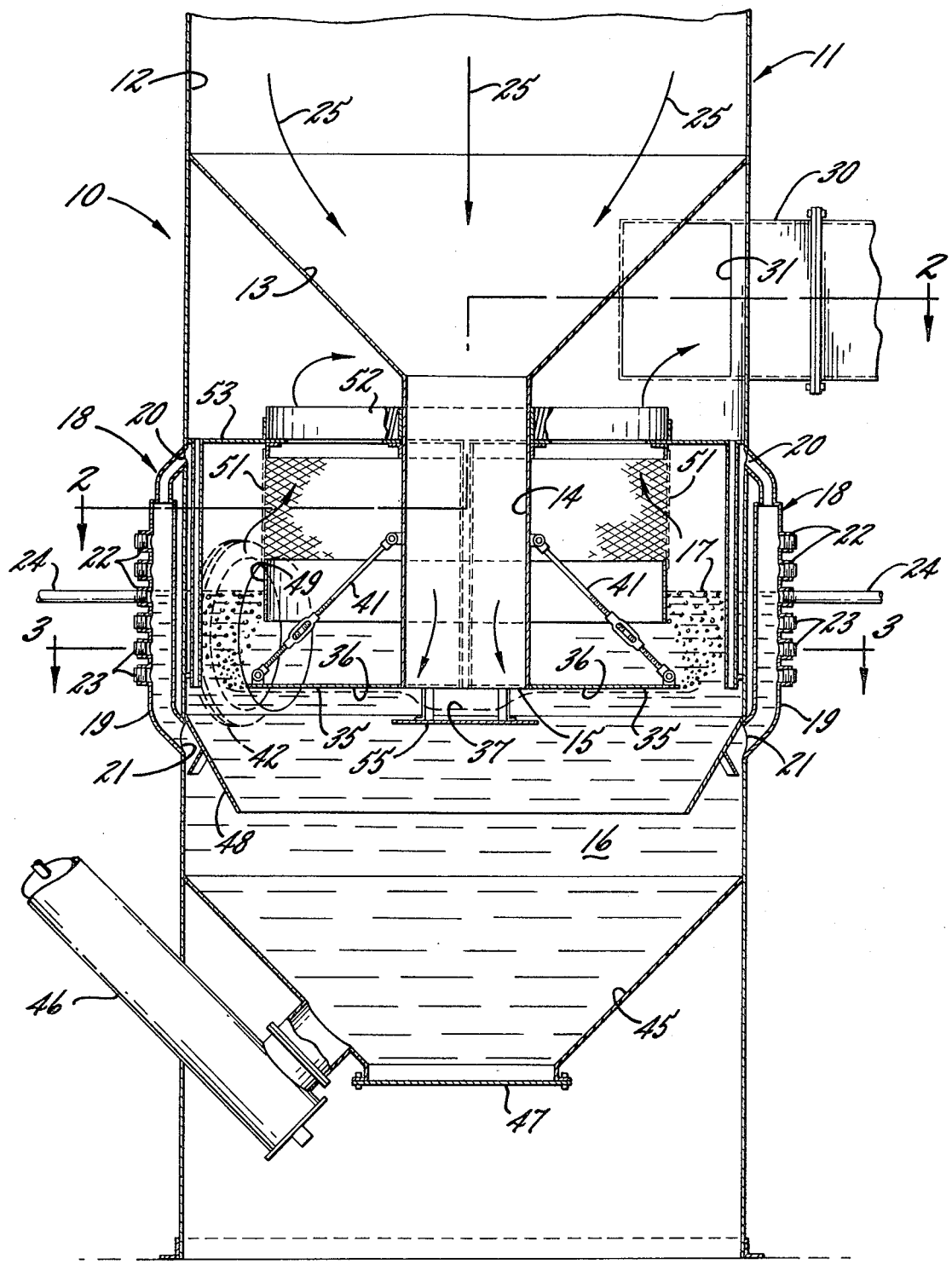
FIG. 1 is a fragmentary section of a scrubber embodying the invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention.

Turning to FIG. 1, there is shown the scrubber portion, constructed in accordance with the invention, of a more extensive gas treatment or collector system 10. The scrubber portion includes a generally cylindrical tank 11 whose upper gas receiving end 12 is funneled at 13 to a nozzle 14 ending in a lower open end 15 disposed generally horizontally and approximately in the middle of the tank 11. The lower end of the tank 11 contains a body of scrubbing liquid 16 whose upper level, in the illustrated arrangement, is indicated by the dashed line 17. The liquid level is maintained by a pair of overflow headers 18 consisting of pipes 19 communicating at upper and lower openings 20 and 21, respectively, with the tank 11. Each header 18 has a plurality of vertically disposed threaded openings 22. Plugs 23 close all but a selected pair of the openings 22, and overflow pipes 24 are connected to the selected pair of openings to establish the liquid level indicated by the line 17. Normally, liquid is continuously added to the tank 11 in the form of gas cooling sprays added to the gas stream, indicated by the arrows 25, at an earlier point in the system 10. It will be appreciated that, by repositioning the overflow pipes 24 into another selected pair of the threaded openings 22, a different head can be established for the scrubbing liquid.

For driving the gas through the scrubber, an exhaust duct 30 opens at 31 into the tank 11 well above the liquid level, and the duct 30 is connected to a gas driving fan, not shown.

In accordance with the invention, the nozzle end 15 is well beneath the scrubbing liquid level and a distributing plate 35 is secured to the nozzle 14 so as to extend radially therefrom in a generally horizontal plane from the opening 15 so as to define a substantially flat, horizontal surface 36 surrounding the open end 15 beneath which the gas is forced. The gas, at a high volumetric rate, is thus impinged directly on the liquid surface in an area 37, and the gas then escapes radially at the interface between the surface 36 and the liquid. The pressure of the liquid head, and the reduced gas pressure resulting from the increased speed of the gas beneath the surface 36, produces a very thin high velocity gas stream passing from the nozzle opening 15 beneath the surface 36 and thence into the body of the scrubbing liquid. At the edge of the distributing plate 35, the gas again abruptly changes direction and bubbles upwardly.

It will be noted that since the plate 35 surrounds the nozzle end 15, the gas must flow radially beneath the surface 36 and hence there is not only a pressure drop resulting from the increased velocity of the gas flow but also the pressure drops as a result of radial expansion of the gas. This causes the liquid surface to closely approach the plate surface 36, constricting the passage through which the gas moves and defining the thin, high velocity gas stream.

Separation of solids occurs when the gas impinges on the liquid area 37. Further scrubbing action occurs as the very thin stream of gas moves between the liquid-surface 36 interface. Still further separation is believed to occur as the gas is flung outwardly from the periphery of the distributing plate 35 at high velocity.

Preferably, the nozzle end 15 is circular and the distributing plate 35 annular. To insure that the plate 35 remains in a substantially flat horizontal relationship, a plurality of turn-buckle fitted support rods 41 are connected between the sides of the nozzle 14 and the periphery of the plate 35. Access doors 42 in the side of the tank 11 permit the rods 41 to be readily extended or shortened to produce the proper disposition of the plate 35.

To illustrate the action of the plate 35, it has been found that if the plate is not utilized, violent bubbling occurs as gas is forced from the nozzle 14 into the scrubber liquid. When a distributing plate is used, vigorous bubbling occurs in the liquid and, as the diameter of the plate is increased, only frothy bubbling is encountered at the periphery of the plate. The diameter of the plate 35 should increase in direct proportion to the volumetric flow rate of the gas being handled by the apparatus but good results have been obtained if the diameter of the plate 35 is at least 3½ times greater than the diameter of the nozzle open end 15.

The violence of the bubbling action and the efficiency of the system is also affected by the liquid head relative to the position of the distributor plate 35. An increasing head produces better results as the volumetric flow rate of the gas increases. It is for this purpose that the headers 18 are provided since the head can be adjusted for best results with a given gas flow.

Solids separated from the gas flow are collected in a tapered bottom portion 45 and preferably are continually removed by, in the illustrated construction, an auger conveyor 46. A removable lower door 47 permits periodic cleaning of the scrubber. A funnel-like skirt 48 mounted within the tank 11 beneath the plate 35 directs solids downwardly into the scrubbing liquid body and minimizes the amount of material carried up around the skirt 48 to the overflow pipes 24.

To minimize agitation or wave action at the liquid surface, a stabilizer in the form of a cylindrical metal band 49 surrounds the nozzle 14 and extends through the upper surface of the scrubber liquid.

To minimize the amount of water carried away by the scrubbed gas, the gas passes from the scrubbing liquid through a cylindrical screen 51 and an annular demister 52 mounted in a ring structure 53 secured within the tank. The demister 52 is of the conventional type which includes a plurality of curved plates setting up a spiraling motion in the gas stream tending to separate, by centrifugal force, liquid entrained in the gas flow. The screen 51 collects large liquid particles and creates minor disturbances in the gas stream so as to further separate liquid from gas being taken from the tank 11. It will be noted that the exhaust duct 30 is positioned to assist the swirling flow of gas through the demister.

For insuring proper start-up action, a baffle plate 55 is positioned beneath and over the open nozzle end 15. The plate 55 insures that, upon initial gas flow, there is no initial violent bubbling or gushing of the gas from the nozzle 14. As soon as the gas flow is established along the plate 35, the inherent resulting pressure reduction insures proper operation of the scrubber.

It can be seen that substantially only the surface 36 is contacted by high velocity gases carrying particulate matter and, even at this point in the arrangement, many of the particles have been removed by impingement of the gas on the liquid area 37. Thus, corrosion and abrasion effects are minimal in the disclosed arrangement. Those skilled in the art will appreciate that the addition of neutralizing compounds into the scrubber liquid will help control corrosion by reducing the pH factor. Also, suitable solvents or condensing liquids can be added to the liquid to neutralize or remove obnoxious gases. The very thin stream of gas moving beneath the surface 36 insures a good contact and high reaction efficiency between the scrubber liquid and virtually all of the gas passing through the system 10.

I claim as my invention:

1. In a gas scrubber, the combination comprising, a tank for containing scrubber liquid, a gas inlet nozzle mounted in said tank with a lower open end disposed generally horizontally near the center of the tank, means for establishing a scrubber liquid level in said tank above said nozzle open end, said tank having a gas exhaust opening above the liquid level, and a distributing plate secured to said nozzle at said open end and extending radially therefrom in a generally horizontal plane so as to define a surface surrounding said nozzle open end beneath which gas must flow from the nozzle to escape into the liquid.

2. The combination of claim 1 in which said open end is circular and said plate is flat and annular, the combination including adjustable supports for said plate facilitating horizontal alinement of the plate.

3. The combination of claim 2 in which the diameter of the plate is at least 3½ times greater than the diameter of said open end.

4. The combination of claim 1 in which said means permits adjustment of the liquid level above said nozzle open end.

5. The combination of claim 1 including a baffle plate secured to said nozzle and spaced below said open end.

6. The combination of claim 1 including a wave arrestor band surrounding said nozzle and extending through the upper surface of the scrubber liquid, and a conveyor at the bottom of said tank for removing settled solid matter from the tank.

7. The method of scrubbing a gas comprising the steps of discharging the gas at a high volumetric rate into a body of scrubber liquid, and forcing the gas beneath a substantially flat horizontal surface prior to releasing the gas for upward bubbling movement from the liquid, the interface between said surface and said liquid being thus separated by a thin, high velocity stream of gas.

8. The method of claim 7 including the steps of controlling the thickness and velocity of said stream by adjusting said volumetric rate and the head of scrubber liquid above said surface.

* * * * *